United States Patent [19]

Logan

[11] 4,127,442

[45] Nov. 28, 1978

[54] CHARGE EXCHANGE COOLING IN THE TANDEM MIRROR PLASMA CONFINEMENT APPARATUS

[75] Inventor: B. Grant Logan, Danville, Calif.

[73] Assignee: The United States of America as represented by the United States Department of Energy, Washington, D.C.

[21] Appl. No.: 807,082

[22] Filed: Jun. 16, 1977

[51] Int. Cl.² .............................................. G21B 1/00
[52] U.S. Cl. .......................................... 176/3; 176/5; 176/7
[58] Field of Search .................................. 176/1, 3, 5, 7

[56] References Cited

U.S. PATENT DOCUMENTS

| | | | |
|---|---|---|---|
| 3,015,748 | 1/1962 | Hartwig et al. | 176/7 |
| 3,101,310 | 8/1963 | Post | 176/7 |
| 3,170,841 | 2/1965 | Post | 176/5 |
| 3,437,871 | 4/1969 | Cann et al. | 176/7 |
| 3,452,249 | 1/1969 | Cann | 176/7 |
| 3,508,104 | 4/1970 | Braams | 176/1 |
| 3,527,977 | 9/1970 | Ruark | 176/7 |
| 3,655,508 | 4/1972 | Hirsch | 176/7 |
| 3,668,067 | 6/1972 | Christofilos | 176/5 |
| 3,723,246 | 3/1973 | Lubin | 176/1 |
| 3,728,217 | 4/1973 | Dandl | 176/3 |

FOREIGN PATENT DOCUMENTS 873,057  7/1961  United Kingdom .................. 176/3

OTHER PUBLICATIONS

9 Plasma Physics 503 (1967), Kelley.
Nuclear Fusion 9 (1969), Moir et al., pp. 253-258.
2 Soviet Journal of Plasma Physics 597 (Jul.-Aug. 1976), Dimov et al.
UCRL-50002-74 pp. 1-140.

Primary Examiner—Samuel W. Engle
Assistant Examiner—S. A. Cangialosi
Attorney, Agent, or Firm—Dean E. Carlson; R. S. Gaither; P. Martin Simpson, Jr.

[57] ABSTRACT

Method and apparatus for cooling a plasma of warm charged species confined in the center mirror cell of the tandem mirror apparatus by injecting cold neutral species of the plasma into at least one mirroring region of the center mirror cell, the cooling due to the loss of warm charged species through charge exchange with the cold neutral species with resulting diffusion of the warm neutral species out of the plasma.

6 Claims, 5 Drawing Figures

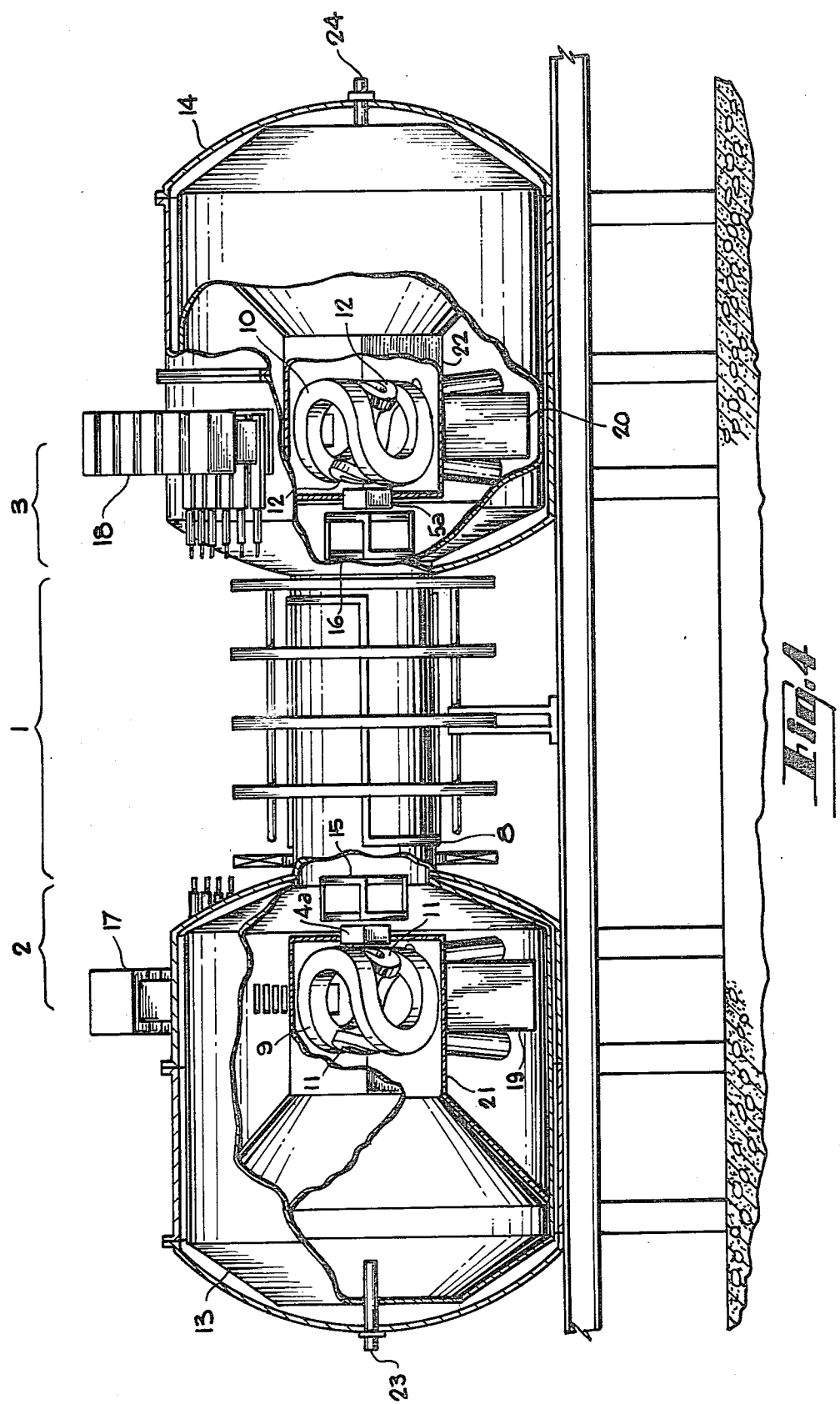

CHARGE EXCHANGE COOLING IN THE TANDEM MIRROR PLASMA CONFINEMENT APPARATUS

The invention described herein was made at Lawrence Livermore Laboratory in the course of, or under, contract AEC W-7405-ENG-48 with the United States Energy Research and Development Administration.

FIELD OF INVENTION

This invention pertains to the confinement of plasmas by magnetic fields.

This application is related to the United States Energy Research and Development Administration application 807,081 filed concurrently herewith.

BACKGROUND OF THE INVENTION (a) Field

Apparatuses employed for the containment of plasmas by magnetic fields utilize many varied configurations. Two well-known categories of these machines are the open-ended type such as the magnetic mirror and the toroidal type such as the tokamak and the stellarator. One advantage to the toroidal type is that a trapped charged particle must move laterally across magnetic field lines to escape confinement. As a result both ions and electrons are confined in a toroidal apparatus for many collision times. (Unless stated otherwise ion shall be taken to mean positive ion hereinafter.) Since the ions tend to remain in a spiral orbit about a givem set of magnetic field lines, the continuity of the magnetic field lines inside the apparatus tends to ensure containment.

Apparatuses of the open-ended type have the disadvantage that the trapped charged particles may escape while traveling along the magnetic field lines which define their spiral orbits. The magnetic field lines do not close on themselves inside the simple magnetic mirror. As a result, the simple magnetic mirror suffers large plasma losses out the mirror ends. The net positive potential of the confined plasma adds to the losses since the ions are confined better than electrons in a simple magnetic mirror. One early mirror confinement apparatus is disclosed in Post, U.S. Pat. No. 3,170,841, filed on July 14, 1954.

The physics of a simple magnetic mirror is discussed at length in the Post patent as well as in Samual Glasstone and Ralph H. Loveberg, Chapter 9, "Magnetic Mirror Systems," *Controlled Thermonuclear Reactions*, D. Van Nostrand Co., Inc., Princeton, New Jersey (1960), p. 336, et seq and in David J. Rose and Melville Clark, Chapter 10, "Motion of the Individual Charges," *Plasmas and Controlled Fusion*, John Wiley & Son, Inc., New York (1961) p. 198, et seq.

(b) Prior Art

The problem of end losses in magnetic mirrors has been addressed in a number of ways. One approach links several mirrors together to form roughly a toroidal configuration with magnetic field lines closed inside the apparatus. Particles which leak out of one magnetic mirror simply leak into an adjacent magnetic mirror. Post noted this in FIG. 25 of U.S. Pat. No. 3,170,841, supra. Other closed systems of linked magnetic mirrors include Dandl, U.S. Pat. No. 3,728,217. Each magnetic mirror segment is independent of the next, the total effect on the toroidally confined plasma being a stabilization and confinement of the plasma, which is by means other than by electrostatic plugs.

In linked three-cell systems the earliest prior art appears in FIG. 22 of Post, U.S. Pat. No. 3,170,841. However Post's three-cell system does not operate as three cells simultaneously. The end cells exist as thermonuclear reaction zones alternately and do not serve to electrostatically stopper the central cell.

A three-mirror system to change the potential at the linking magnetic mirrors is suggested by G. G. Kelley, 9 Plasma Physics 503 (1967). Since electrons travel more freely through the mirroring regions than ions, the mirroring regions have a net negative charge. Thus, ions which would have mirrored are drawn deeper into the mirroring region, and some are lost. To overcome this enhanced end loss Kelley injected cold neutral species into the mirroring regions of the center mirror cell of a three mirror cell system. The cold neutral species ionize; thus, these mirroring regions substantially lose their negative potential. Kelley did not try to make the end mirror cells electrostatic end plugs to stop end-losses in the center mirror cell. He addressed a problem of enhanced end losses without touching on the basic end-loss problem in an open-ended system. For three similar mirrors heating may be desired but not cooling. Kelley never considered his cold neutral beam sources for cooling.

The tandem mirror is a method and apparatus for confining a plasma in a center mirror cell by use of two end mirror cells as positively charged end stoppers. Leakage of ions from the center mirror cell is minimized. T. K. Fowler first published this idea in T. K. Fowler, *End Stoppering in Mirror Machines*, Lawrence Livermore Laboratory Rept. UCID-17244 (1976). G. I. Dimov, V. V. Zakaidakov, and M. E. Kishinevsky, 2 Soviet Journal of Plasma Physics 597 (July–August 1976) is a publication of the tandem mirror idea as well. In neither publication is the cooling of the ions in the center mirror cell considered.

Once the temperature for the ions in the center mirror cell is selected, the tandem mirror can confine these ions through the selection of the depth of the potential well between the end mirror cells. However heating can take place, and a hotter ion distribution includes more ions with the energy to climb out of the potential well. Above the temperature of ions desired to be confined in the center mirror cell any temperature increase means less effective end plugging. Simply choosing very dense end mirror cell plasma is expensive in power and capital costs. Thus a way must be found to keep the center mirror cell plasma temperature down. If the entire tandem mirror is made large enough, the problem goes away in scaling, but building a very large machine is expensive. Neither Fowler nor Dimov, et al suggested a means of cooling for the center mirror cell plasma.

SUMMARY OF THE INVENTION

The present invention provides a method and apparatus for cooling a plasma of warm charged species confined in the center mirror cell of the tandem mirror apparatus by injecting cold neutral species of the plasma into at least one mirroring region of the center mirror cell in order to charge exchange with the warm charged species, which then diffuse out of the plasma into a gas dump means.

One object of the invention is to provide a method and an apparatus for cooling a plasma of warm charged species confined in the center mirror cell of the tandem mirror apparatus. A cold neutral species source and injector means injects cold neutral species into the plasma in at least one mirroring region to charge exchange with the warm charged species. Thus the resulting cold charged species move along magnetic field lines while the warm neutral species diffuse out of the plasma carrying their energy with them. A gas dump means located about the periphery of the plasma in the vicinity of the source and injection means pumps the warm neutral species which have diffused away from the plasma.

BRIEF DESCRIPTION OF DRAWINGS

FIG. 4 is a side view of a third alternate preferred embodiment showing the first and second gas box, first and second gas dump means, current-carrying coils to set up the required magnetic fields, field shaping coils, energetic neutral beam sources to sustain the end mirror cells, streaming guns, energetic gas dump means, and the liquid nitrogen liners.

DESCRIPTION OF PREFERRED EMBODIMENTS

Figure 1:
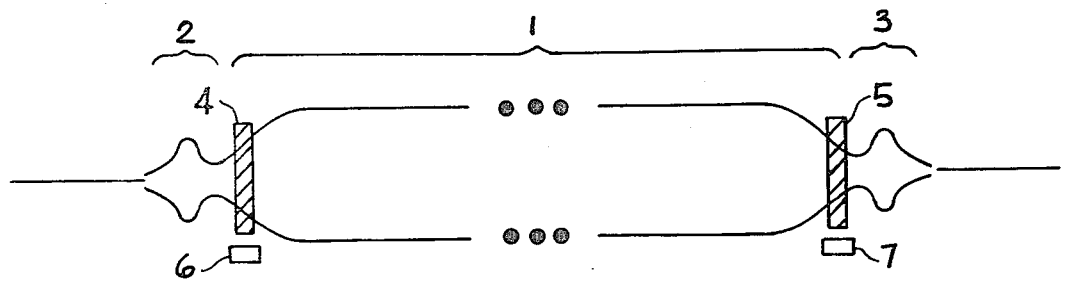
FIG. 1 is a schematic of the preferred embodiment showing a side view of the plasma in the three mirror cells and the general location of the first and second source and injection means and the first and second gas dump means.

FIG. 1 is a schematic of the tandem mirror apparatus with the present invention for charge exchange cooling of the plasma in the center mirror cell 1. The first end mirror cell 2 and the second end mirror cell 3 are shown linked to the ends of the center mirror cell 1 along continuous magnetic field lines running through the interior of each mirror cell. A mirror cell may be defined as the space along continuous magnetic field lines between two regions where the magnetic field lines come closer together signifying an increasing magnetic field strength. As explained in Chapter 9 of Glasstone and Loveberg, supra, the increasing magnetic field strength creates a mirroring region for charged particles moving in a magnetic field. A charged particle between two mirroring regions in which the particle does mirror is trapped in a mirror cell. In FIG. 1 the magnetic field lines move closer together in four regions along the system axis running through the center of each of the mirror cells. These four regions form the mirroring regions for the three mirror cells of the tandem mirror apparatus.

The present invention concerns the use of cold neutral species injected into the mirroring region of at least one end of the center mirror cell 1. A fraction of these cold neutral species are ionized by charge exchange with the warm charged species confined in the center mirror cell. The charge exchange process is the interaction between a neutral atom or molecule and an ion where the neutral atom or molecule exchanges one or more electrons with the ion. The ion may be positive or negative; however, ion shall mean positive ion hereinafter.

In the tandem mirror, most of the charge exchange interaction taking place is the exchange of an electron from the cold neutral species injected to the warm charged species confined. The result in most cases is a cold charged species, which moves along magnetic field lines, and a warm neutral species, which diffuses out of the plasma. When the warm neutral species or cold neutral species strike the pumping surfaces inside the tandem mirror, they are pumped off. Thus, some of the warm charged species are removed from the center mirror cell plasma, and cold charged species are substituted. The difference in energy between the warm and cold charged species represents an energy loss to the center mirror cell plasma. This energy loss is the cooling mechanism in charge exchange cooling.

For the cooling mechanism to work, the warm neutral species must not be reionized in the center mirror cell plasma. If the injection of cold neutral species were into the center mirror cell directly instead of in a mirroring region, the warm neutral species would have a substantial chance of being reionized before diffusing out of the center mirror cell plasma. Upon such a reionization, the energy which would have been lost to the center mirror cell plasma is retained. A plasma follows the magnetic field lines which travel through and around it.

In a mirroring region the magnetic field lines are closer together than in the center of a mirror cell. The plasma follows the magnetic field lines into a smaller volume in the mirroring regions. For charge exchange cooling, this smaller volume means a shorter distance for most warm neutral species to diffuse out of the center mirror cell plasma. The shorter distance to diffuse means a lessened change for reionization to occur. Thus, charge exchange cooling is more effective when the cold neutral species enter the plasma in a mirroring region. In particular, the fan-shaped geometry of the Baseball and 2X experiments provide a mirroring region which is compressed in one dimension providing a shorter distance for most warm neutral species to diffuse out of the plasma. For a discussion and references on the 2X, Baseball, and related research see the Controlled Thermonuclear Research annual reports for 1974 and 1975 in Lawrence Livermore Laboratory reports UCRL-50002-74 (1974) and UCRL-50002-75 (1975). For present purposes, the feature of interest is the elliptical cross section as well as smaller volume in the mirroring regions.

The schematic in FIG. 1 illustrates where the source and injection means is located. The first source and injection means 4 injects cold neutral species into the mirroring region of the center mirror cell 1 adjacent to the first end mirror cell 2. The second source and injection means 5 injects cold neutral species into the mirroring region of the center mirror cell 1 adjacent to the second end mirror cell 3. The first gas dump means 6 is located about the periphery of the plasma in the vicinity of the first source and injection means 4. The second gas dump means 7 is located about the periphery of the plasma in the vicinity of the of the second source and injection means 5. The gas dumps must not be in contact with the plasma but must be close enough to intercept and hold neutral species near the plasma. The first and second gas dump means function to pump off the warm neutral species, the cold neutral species, and other gases. The pumping may include cryopanels, gettering, stoppering may be found in T. K. Fowler, *End Stoppering in Mirror Machines,* Lawrence Livermore Laboratory Report UCID-17244 (1976).

Figure 5:
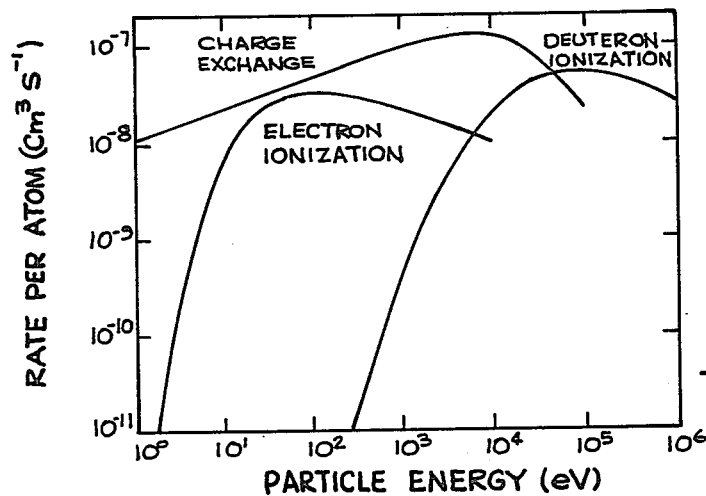
FIG. 5 is a graph illustrating rate coefficients for electron and deuteron ionization and charge exchange.

FIG. 5 is a graph illustrating rate coefficients for electron and deuteron ionization and charge exchange. For a neutral beam entering a plasma, the charge exhange reaction occurs more often than ionization due to electrons or deuterons. The charge exchange cooling can be useful up to about 80 keV with a center mirror cell plasma of deuterons. The charge exchange should take place in a mirroring region of the center mirror cell for charge exchange to act as a significant cooling mechanism however. To represent an energy loss the warm neutral species must be able to diffuse out of the center mirror cell plasma before being reionized.

This invention has been described by way of illustration rather than limitation and it should be apparent that it is equally applicable in fields other than those described.

I claim:

1. A method of increasing the confinement time of a plasma of warm charged species confined through cooling of said species in the center mirror cell of a tandem mirror plasma confinement apparatus comprising:

a first end mirror cell comprising an array of current-carrying coils, arranged to produce a minimum B magnetic field of multi-Tesla strength at the current-carrying coils;

a second end mirror cell comprising an array of current-carrying coils, arranged to produce a minimum B magnetic field of multi-Tesla strength at the current-carrying coils;

a center mirror cell, positioned between the first end mirror cell and the second end mirror cell so as to enclose continuous magnetic field lines between the first end mirror cell and the second end mirror cell, the center mirror cell comprising a solenoid of discrete current-carrying coils;

the magnetic field strength at the current-carrying coils of the solenoid being less than the magnetic field strength at the current-carrying coils of the first or second end mirror cell;

a first field shaping coil positioned about the magnetic field lines passing between the interiors of the first end mirror cell and the center mirror cell so as to shape the magnetic field lines from an elliptical cross section on the first end mirror cell side of the first field shaping coil to a circular cross section on the center mirror cell side of the first field shaping coil;

a second field shaping coil positioned about the magnetic field lines passing between the interiors of the second end mirror cell and the center mirror cell so as to shape the magnetic field lines from an elliptical cross section on the second end mirror cell side of the second field shaping coil to a circular cross section on the center mirror cell side of the second field shaping coil;

a first neutral beam source to introduce energetic neutral species of the plasma to be confined into the first end mirror cell so as to maintain a higher density and temperature for positively charged particles in the first end mirror cell than in the center mirror cell;

a second neutral beam source to introduce energetic neutral species of the plasma to be confined into the second end mirror cell so as to maintain a higher density and temperature for the resulting positively charged particles in the second end mirror cell than in the center mirror cell;

a first target production means for generating a target plasma in the first end mirror cell for startup;

a second target production means for generating a target plasma in the second end mirror cell for startup;

a vacuum pumping means for evacuating the inside of the plasma confinement apparatus;

whereby the first end mirror cell and the second end mirror cell plasma each develop a net positive charge, the center mirror cell plasma develops a net negative charge, the first and second end mirror cell plasmas repel positively charged particles contained in the center mirror cell, and the end mirror cells electrostatically end stoppering the center mirror cell, the method comprising:

injecting cold neutral species into at least one mirroring region of the center mirror cell;

interacting the cold neutral species with the warm charged species so as to undergo charge exchange to neutralize a portion of the warm charged species to warm neutral species;

diffusing the warm neutral species out of the mirroring region where it was neutralized;

pumping the warm neutral species;

whereby the plasma to be contained in the center mirror cell is cooled by the loss of a portion of the warm charged species as warm neutral species.

2. Apparatus for increasing the confinement time of the plasma of warm charged species confined through cooling of said species in the center mirror cell of the tandem mirror plasma confinement apparatus comprising:

a first end mirror cell comprising an array of current-carrying coils, arranged to produce a minimum B magnetic field of milti-Tesla strength at the current-carrying coils;

a second end mirror cell comprising an array of current-carrying coils, arranged to produce a minimum B magnetic field of multi-Tesla strength at the current-carrying coils;

a center mirror cell, positioned between the first end mirror cell and the second end mirror cell so as to enclose continuous magnetic field lines between the first end mirror cell and the second end mirror cell, the center mirror cell comprising a solenoid of discrete current-carrying coils;

the magnetic field strength at the current-carrying coils of the solenoid being less than the magnetic field strength at the current-carrying coils of the first or second end mirror cell;

a first field shaping coil positioned about the magnetic field lines passing between the interiors of the first end mirror cell and the center mirror cell so as to shape the magnetic field lines from an elliptical cross section on the first end mirror cell side of the first field shaping coil to a circular cross section on the center mirror cell side of the first field shaping coil;

a second field shaping coil positioned about the magnetic field lines passing between the interiors of the second end mirror cell and the center mirror cell so as to shape the magnetic field lines from an elliptical cross section on the second end mirror cell side of the second field shaping coil to a circular cross section on the center mirror cell side of the second field shaping coil;

and mechanical pumps. A standard reference on vacuum technology in Saul Dushman, *Scientific Foundations of Vacuum Techniques*, 2nd Ed., Wiley, New York (1962).

Figure 2:
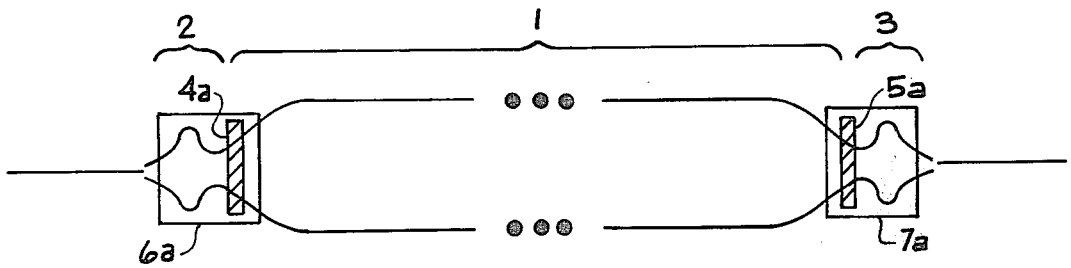
FIG. 2 is a schematic of a first alternate preferred embodiment showing a side view of the plasma in the three mirror cells and the location of the first and second gas boxes and the first and second gas dump means.

FIG. 2 is a schematic representation of the tandem mirror apparatus with the first source and injection means 4 a first gas box 4a. The second source and injection means 5 is a second gas box 5a. A gas box is a compartment usually surrounding part of the mirroring region of a mirror cell. The sides of the compartment are cut out to the extent necessary for the mirror cell plasma to pass unhindered through the part of the mirroring region surrounded by the gas box. These cut-out sides have circular holes for solenoids and elliptical holes for the fan-shaped geometry of the 2X or Baseball experiments. If the magnetic field lines are in transition from a solenoid to a fan-shaped geometry, the cut-out sides may not be circular for a mirroring region of the solenoid. B. G. Logan, et al, 37 Physical Review Letters 1468 (29 November 1976) describes a gas box in use.

A gas box is simply a compartment with the previously mentioned cut-out sides plus provision for neutral gas under pressure to be vented into the gas box. The rate at which the gas is let into the gas box is determined by the charge exchange cooling needed, and by the rate at which new ions are needed in the center mirror cell plasma. A gas box may serve both of these functions for the center mirror cell. The center mirror cell loses ions through end losses of the ions with the higher energies of energy distribution in the center mirror cell plasma. Processes other than charge exchange add cold charged species without loss of warm charged species, and not all warm neutral species from charge exchange diffuse out of the center mirror cell plasma before being reionized. Gas dump means 6a and gas dump means 7a near the mirroring regions of the center mirror cell adjacent to the first end mirror cell and the second end mirror cell, respectively.

Figure 3:
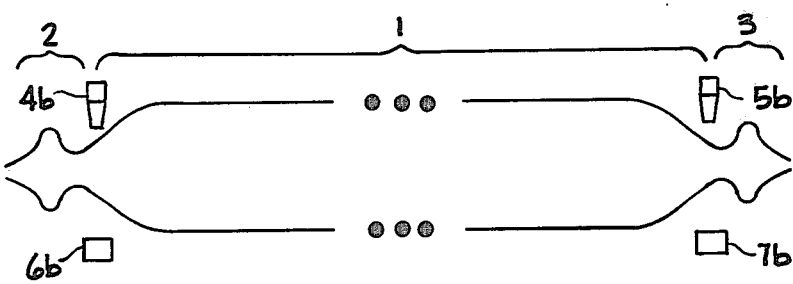
FIG. 3 is a schematic of a second alternate preferred embodiment showing a side view of the plasma in the three mirror cells and the location of the first and second cold neutral beam sources and the first and second gas dump means.

FIG. 3 is a schematic representation of the tandem mirror apparatus with the first source and injection means 4 a first cold neutral beam source 4b. The second source and injection means 5 is a second cold neutral beam source 5b. Opposite to first cold neutral beam source 4b is a gas dump means 6b designed to pump particles which diffuse from the center mirror cell plasma and particles which are in a beam from the first cold neutral beam source 4b. The gas dump means 7b is disposed likewise to pump gas diffusing from the center mirror cell and gas forming part of the beam from the second cold neutral beam source 5b.

FIG. 4 is the design for a small-scale experiment for a tandem mirror apparatus at Lawrence Livermore Laboratory. The center mirror cell 1 is a solenoid of discrete current carrying coils with Ioffe bars 8. The magnetic field in each of the first and second end mirror cells 2 and 3 is set up by a Baseball coil 9 and a Baseball coil 10, respectively. Field shaping coils 11 and 12 change the cross section of the magnetic field from elliptical for the Baseball coils to circular for the solenoid of the center mirror cell 1 and for the first and second exterior gas dumps 13 and 14, respectively. The first and second transition Ioffe bars, 15 and 16 respectively, help shape the magnetic field as well.

Located in the mirroring regions of the center mirror cell 1 are the first gas box 4a adjacent to the first end mirror cell 2 and the second gas box 5a adjacent to the second end mirror cell 3. The first energetic neutral beam source 17 injects energetic neutral species into the first end mirror cell plasma, and the second energetic neutral beam source 18 injects energetic neutral species into the second end mirror cell plasma. Opposite the first and second energetic neutral beam sources are the first energetic particle beam dump 19 and the second energetic particle beam dump 20, respectively. The first and second liquid nitrogen liners, 21 and 22, partition and help pump off the gas load in the first and second end mirror cells, respectively. All interior surfaces except for the first and second gas boxes are covered by fresh gettering to provide Ti surfaces to absorb the hydrogen and hydrogen isotope species. Thus most interior surfaces of this tandem mirror apparatus are included in the gas dump means 6 and 7. The first streaming gun 23 and the second streaming gun 24 inject cold ions down the exterior magnetic field lines into the first and second end mirror cells, respectively. These cold ions are used as a target to ionize atoms in the energetic neutral beams. The first and second end mirror cell plasmas thus formed are steadily built up to the number density desired.

Operational characteristics include the magnetic field strength and plasma values. The magnetic field strength in the first and second end mirror cells is approximately one Telsa and the magnetic field in the center mirror cell may range from 0.05 to 0.3 Tesla. The first and second end mirror cells have an ion temperature of 26 keV and an ion density of $5 \times 10^{13}$ ions/cm$^3$. The center mirror cell plasma has an ion temperature of 100 eV and an ion density of $1 \times 10^{13}$ ions/cm$^3$. The electron temperature in all three mirror cells is 200 eV with the electron density closely following the ion density. However, the first and second end mirror cell plasmas maintain a net positive charge, and the center mirror cell plasma maintains a net negative charge.

The tandem mirror idea uses the net positive charge developed by simple mirror cell plasmas to create a potential well for positive ions in the center mirror cell of three linked mirror cells. If the end mirror cell plasmas are dense enough and energetic enough, these plasmas will develop a net positive charge sufficient to contain most of the ions in the center mirror cell plasma of a given energy and density. This balance may be seen from the equation $$\tau_C = \tau_{ii} g(R) (T_e/T_c) \ln (n_p/n_c)(n_p/n_c)^{T_e/T_c}$$

where $\tau_C$ is the center mirror cell confinement time
$\tau_{ii}$ is the ion-ion collision time $$g(R) = \sqrt{\pi} (2R+1) \ln (4R+2)/4R$$

a slow function of the mirror ratio $R = B$ (mirror)/$B$ (solenoid) for the center mirror cell.

$T_e$ is the electron temperature which is the same in all three mirror cells.
$T_c$ is the ion temperature in the center mirror cell.
$n_p$ is the ion number density in the end mirror cells.
$n_c$ is the ion number density in the center mirror cell.
The center mirror cell confinement time $\tau_C$ is chosen by varying the ratios of $T_e$ to $T_c$ and $n_p$ to $n_c$. Provided $T_e \geq T_c$, a proper choice of injection flux of ions into the center mirror cell and into the end mirror cells maintains an arbitrary density ratio $n_p/n_c > 1$, so that any enhancement of $\tau_C$ over $\tau_{ii}$ is feasible. Confinement of the center mirror cell plasma is possible over a greater time than in a simple mirror cell. A discussion of end a first neutral beam source to introduce energetic neutral species of the plasma to be confined into the first end mirror cell so as to maintain a higher density and temperature for positively charged particles in the first end mirror cell than in the center mirror cell;

a second neutral beam source to introduce energetic neutral species of the plasma to be confined into the second end mirror cell so as to maintain a higher density and temperature for the resulting positively charged particles in the second end mirror cell than in the center mirror cell;

a first target production means for generating a target plasma in the first end mirror cell for startup;

a second target production means for generating a target plasma in the second end mirror cell for startup;

a vacuum pumping means for evacuating the inside of the plasma confinement apparatus;

whereby the first end mirror cell and the second end mirror cell plasma each develop a net positive charge, the center mirror cell plasma develops a net negative charge, the first and second end mirror cell plasmas repel positively charged particles contained in the center mirror cell, and the end mirror cells electrostatically end stoppering the center mirror cell, the apparatus comprising:

source and injection means, adjacent to at least one mirroring region, for injecting cold neutral species into the plasma to undergo charge exchange with the warm charged species;

gas dump means, located about the periphery of the plasma in the vicinity of a source and injection means, for pumping neutral species.

3. Apparatus according to claim 2 wherein said source and injection means includes a first gas box positioned at the mirroring region of the center mirror cell adjacent to the first end mirror cell.

4. Apparatus according to claim 3, wherein said source and injection means includes a second gas box positioned at the mirroring region of the center mirror cell adjacent to the second end mirror cell.

5. Apparatus according to claim 2, wherein said source and injection means includes a first cold neutral beam source injecting cold neutral species into the mirroring region of the center mirror cell adjacent to the first end mirror cell.

6. Apparatus according to claim 5, wherein said source and injection means includes a second cold neutral beam source injecting cold neutral species into the mirroring region of the center mirror cell adjacent to the second end mirror cell.

* * * * *